(12) United States Patent
Gardner et al.

(10) Patent No.: US 9,997,290 B2
(45) Date of Patent: Jun. 12, 2018

(54) VARIABLE INDUCTOR AND WIRELESS COMMUNICATION DEVICE INCLUDING VARIABLE DEVICE FOR CONVERSION OF A BASEBAND SIGNAL TO A RADIO FREQUENCY (RF) RANGE

(71) Applicant: Intel Corporation, Santa Clara, CA (US)

(72) Inventors: Donald S. Gardner, Mountain View, CA (US); Hossein Alavi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 14/752,180

(22) Filed: Jun. 26, 2015

(65) Prior Publication Data

US 2016/0379752 A1    Dec. 29, 2016

(51) Int. Cl.
| | |
|---|---|
| *H01F 21/08* | (2006.01) |
| *H01F 27/28* | (2006.01) |
| *H01F 29/14* | (2006.01) |
| *H01F 21/00* | (2006.01) |
| *H04B 1/00* | (2006.01) |

(Continued)

(52) U.S. Cl.
CPC ............ *H01F 29/14* (2013.01); *H01F 21/00* (2013.01); *H01F 29/146* (2013.01); *H01F 38/14* (2013.01); *H04B 1/005* (2013.01); *H04B 1/18* (2013.01); *H01F 2029/143* (2013.01);

(Continued)

(58) Field of Classification Search
CPC ........ H01F 29/14; H01F 29/146; H01F 38/14; H01F 2029/143; H01F 2038/143; H01F 2038/14; H01F 21/00; H04B 1/005; H04B 1/18; H04B 1/1638; H04B 1/403
USPC ... 336/155, 200, 170, 221, 223, 146, 10, 12, 336/87
See application file for complete search history.

(56) References Cited

U.S. PATENT DOCUMENTS

| | | | | |
|---|---|---|---|---|
| 2,850,707 A | * | 9/1958 | Wroblewski | H01F 5/06 336/207 |
| 3,631,534 A | * | 12/1971 | Hirota | C04B 35/2658 336/155 |

(Continued)

FOREIGN PATENT DOCUMENTS

CN    106298166 A    1/2017

OTHER PUBLICATIONS

"Europeran Application Serial No. 16171193.2, Extended European Search Report dated Nov. 2, 2016", 9 pgs.

(Continued)

*Primary Examiner* — Mangtin Lian
(74) *Attorney, Agent, or Firm* — Schwegman Lundberg & Woessner, P.A.

(57) ABSTRACT

Embodiments of a variable inductor and a communication device are generally described herein. The variable inductor may comprise a signal wire and a control wire to receive a direct current (DC) control current. The variable inductor may further comprise a magnetic material integrated with the signal wire and the control wire. When a DC control current applied to the control wires takes a first current value, an inductance between an input node and an output node on the signal wire may take a first inductance value. When the DC control current takes a second current value, the inductance between the input node and the output node may take a second inductance value.

12 Claims, 7 Drawing Sheets

(51) Int. Cl.
  *H04B 1/18* (2006.01)
  *H01F 38/14* (2006.01)
  *H04B 1/16* (2006.01)
  *H04B 1/403* (2015.01)
(52) U.S. Cl.
  CPC ...... *H01F 2038/143* (2013.01); *H04B 1/1638* (2013.01); *H04B 1/403* (2013.01)

(56) References Cited

U.S. PATENT DOCUMENTS

| | | | |
|---|---|---|---|
| 3,735,305 A | | 5/1973 | Sinnott et al. |
| 4,393,157 A | * | 7/1983 | Roberge ................. H01F 21/08 323/355 |
| 5,040,239 A | | 8/1991 | Kondo |
| 5,426,409 A | * | 6/1995 | Johnson ................... H01F 3/14 336/155 |
| 2006/0139138 A1 | | 6/2006 | Watanabe et al. |
| 2011/0248812 A1 | * | 10/2011 | Hu ......................... H01F 29/14 336/221 |

OTHER PUBLICATIONS

"Chinese Application Serial No. 201610339282.7, Office action dated Aug. 30, 2017", w/English Translation, 26 pgs.
"Chinese Application Serial No. 201610339282.7, Response filed Jan. 11, 2018 to Office Action dated Aug. 30, 2017", w/ claims in English, 21 pgs.

* cited by examiner

VARIABLE INDUCTOR AND WIRELESS COMMUNICATION DEVICE INCLUDING VARIABLE DEVICE FOR CONVERSION OF A BASEBAND SIGNAL TO A RADIO FREQUENCY (RF) RANGE

TECHNICAL FIELD

Some embodiments pertain to inductors, including variable inductors. Some embodiments relate to wireless networks, including those operating in accordance with the IEEE 802.11 family of standards or Third Generation Partnership Project (3GPP) standards. Some embodiments relate to wireless devices, including devices configured to operate in such networks. Some embodiments relate to communication devices for wireless and/or wired communication. Some embodiments relate to sensors and/or sensor networks. Some embodiments relate to electrical devices and/or components that include inductors.

BACKGROUND

New spectrum may be allocated in a variety of frequency bands as demand for wireless services continues to grow. In some cases, wireless devices may roam between networks and/or frequency bands, such as during travel between different countries. Support of multiple frequency bands or variable operating frequency by the wireless devices may provide design challenges in terms of size, cost, number of components or other measure. Accordingly, there is a need for devices and components that support variable frequency bands.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
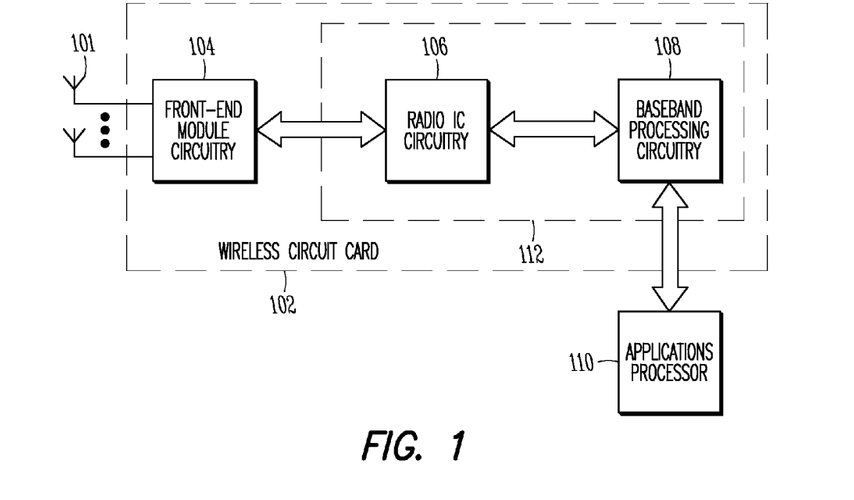
FIG. 1 is a block diagram of a radio architecture in accordance with some embodiments.

FIG. 1 is a block diagram of a radio architecture 100 in accordance with some embodiments. Radio architecture 100 may include front-end module circuitry 104, radio IC circuitry 106 and baseband processing circuitry 108. Front-end module circuitry 104 may include a receive signal path which may include circuitry configured to operate on RF signals received from one or more antennas 101, amplify the received signals and provide the amplified versions of the received signals to the radio IC circuitry 106 for further processing. Front-end module circuitry 104 may also include a transmit signal path which may include circuitry configured to amplify signals for transmission provided by the radio IC circuitry 106 for transmission by one or more of the antennas 101.

Radio IC circuitry 106 may include a receive signal path which may include circuitry to down-convert RF signals received from the front-end module circuitry 104 and provide baseband signals to the baseband processing circuitry 108. Radio IC circuitry 106 may also include a transmit signal path which may include circuitry to up-convert baseband signals provided by the baseband processing circuitry 108 and provide RF output signals to the front-end module circuitry 104 for subsequent transmission.

Baseband processing circuity 108 may include one or more processors and control logic to process the baseband signals received from the receive signal path of the radio IC circuitry 106 and to generate the baseband signals for the transmit signal path of the radio IC circuitry 106. Baseband processing circuity 108 may interface with applications processor 110 for generation and processing of the baseband signals and for controlling operations of the radio IC circuitry 106.

In some embodiments, the antennas 101, the front-end module circuitry 104, the radio IC circuitry 106, and baseband processing circuitry 108 may be provided on a single circuit card, such as wireless circuit card 102, although the scope of the embodiments is not limited in this respect. In some other embodiments, the antennas 101, the front-end module circuitry 104 and the radio IC circuitry 106 may be provided on a single circuit card. In some embodiments, the radio IC circuitry 106 and the baseband processing circuitry 108 may be provided on a single chip or integrated circuit (IC), such as IC 112, although the scope of the embodiments is not limited in this respect.

Figure 2:
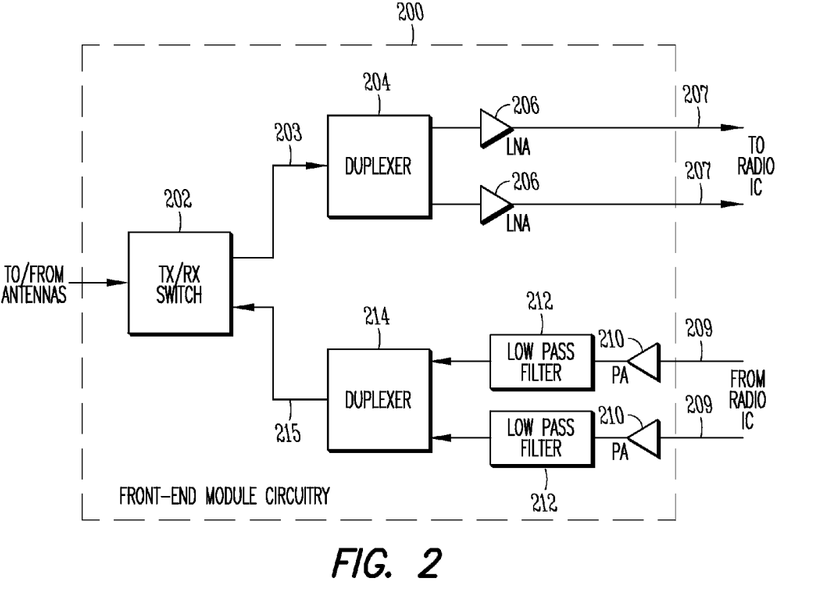
FIG. 2 illustrates front-end module circuitry in accordance with some embodiments.

FIG. 2 illustrates front-end module circuitry 200 in accordance with some embodiments. The front-end module circuitry 200 is one example of circuitry that may be suitable for use as the front-end module circuitry 104 (FIG. 1), although other circuitry configurations may also be suitable. In some embodiments, the front-end module circuitry 200 may include a TX/RX switch 200 to switch between transmit mode and receive mode operation. The front-end module circuitry 200 may include a receive signal path and a transmit signal path. The receive signal path of the front-end module circuitry 200 may include a low-noise amplifier (LNA) 206 to amplify received RF signals 103 and provide the amplified received RF signals 207 as an output (e.g., to the radio IC circuitry 106 (FIG. 1)). The transmit signal path of the front-end module circuitry 200 may include a power amplifier (PA) to amplify input RF signals 209 (e.g., provided by the radio IC circuitry 106), and one or more filters 212 to generate RF signals 215 for subsequent transmission (e.g., by one or more of the antennas 101 (FIG. 1)).

In some embodiments, the front-end module circuitry 200 may be configured to operate in multiple frequency bands. As a non-limiting example, either the 2.4 GHz frequency spectrum or the 5 GHz frequency spectrum may be used. As another example, more than two frequency bands may be used. In these embodiments, the receive signal path of the front-end module circuitry 200 may include a receive signal path diplexer 204 to separate the signals from each spectrum as well as a separate LNA 206 for each spectrum. In these embodiments, the transmit signal path of the front-end module circuitry 200 may also include a power amplifier 210 and a filter 210 for each frequency spectrum and a transmit signal path diplexer 214 to provide the signals of one of the different spectrums onto a single transmit path for subsequent transmission by the one or more of the antennas 101 (FIG. 1). These embodiments are not limiting, however, as the front-end module circuitry 200 may be configured to operate in one frequency band, in some cases.

Figure 3:
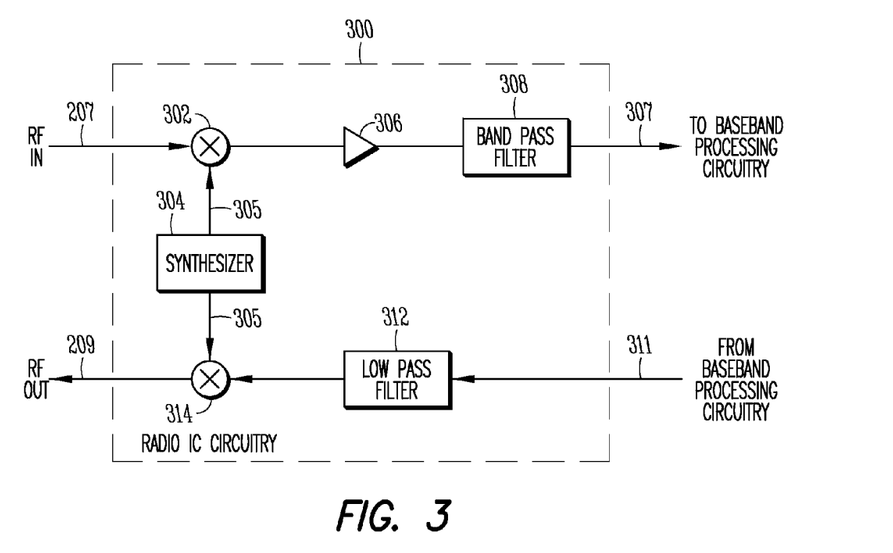
FIG. 3 illustrates radio IC circuitry in accordance with some embodiments.

FIG. 3 illustrates radio IC circuitry 300 in accordance with some embodiments. The radio IC circuitry 300 is one example of circuitry that may be suitable for use as the radio IC circuitry 106 (FIG. 1), although other circuitry configurations may also be suitable. In some embodiments, the radio IC circuitry 300 may include a receive signal path and a transmit signal path. The receive signal path of the radio IC circuitry 300 may include at least mixer circuitry 302, amplifier circuitry 306 and filter circuitry 308. The transmit signal path of the radio IC circuitry 300 may include at least filter circuitry 312 and mixer circuitry 314. Radio IC circuitry 300 may also include synthesizer circuitry 304 for synthesizing a frequency 305 for use by the mixer circuitry 302 and the mixer circuitry 314.

In some embodiments, mixer circuitry 302 may be configured to down-convert RF signals 207 received from the front-end module circuitry 104 (FIG. 1) based on the synthesized frequency 305 provided by synthesizer circuitry 304. The amplifier circuitry 306 may be configured to amplify the down-converted signals and the filter circuitry 308 may be a band-pass filter (BPF) configured to remove unwanted signals from the down-converted signals to generate output baseband signals 309. Output baseband signals 309 may be provided to the baseband processing circuitry 108 (FIG. 1) for further processing. In some embodiments, the output baseband signals 309 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the front-end module circuitry 104. The baseband signals 311 may be provided by the baseband processing circuitry 108 and may be filtered by filter circuitry 312. The filter circuitry 312 may include a low-pass filter (LPF), although the scope of the embodiments is not limited in this respect.

In some embodiments, the output baseband signals 309 and the input baseband signals 311 may be analog baseband signals, although the scope of the embodiments is not limited in this respect. In some alternate embodiments, the output baseband signals 309 and the input baseband signals 311 may be digital baseband signals. In these alternate embodiments, the radio IC circuitry may include analog-to-digital converter (ADC) and digital-to-analog converter (DAC) circuitry. In some dual-mode embodiments, a separate radio IC circuitry may be provided for processing signals for each spectrum, although the scope of the embodiments is not limited in this respect.

Figure 4:
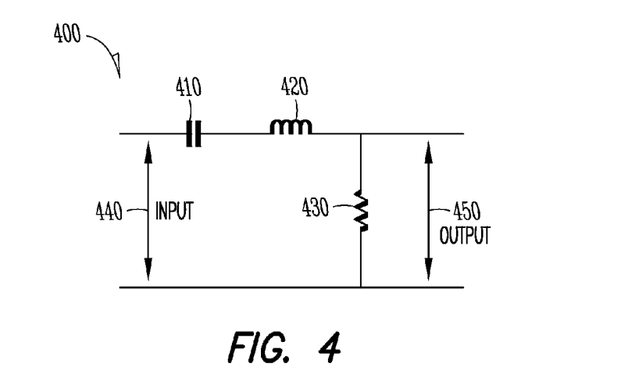
FIG. 4 illustrates an example of an RLC circuit in accordance with some embodiments.

FIG. 4 illustrates an example of an RLC circuit in accordance with some embodiments. The RLC circuit 400 may include a capacitor 410 with capacitance of C, an inductor 420 with inductance of L, and a resistor 430 of resistance R. The input signal may be input at 440 and the output signal may be taken at 450. In some embodiments, the RLC circuit 400 may operate as a band-pass filter that may attenuate, for an input signal, frequencies outside of a bandwidth concentrated at a center frequency. As an example, a center frequency of the RLC circuit 400 may be related to 1/sqrt(L*C) and a half-power bandwidth may be related to (R/L). In some embodiments, the inductor 420 may be a variable inductor or a tunable inductor, such that the inductance L may be varied or tuned. Accordingly, the center frequency and/or the bandwidth of this example RLC circuit 400 may be tuned by tuning of the inductance L.

It should be noted that the RLC circuit 400 shown in FIG. 4 is an example of a band-pass filter in which some of the components described herein, such as variable inductor embodiments, may be included. In some embodiments, a band-pass filter, low-pass filter, band-reject filter, notch filter or other component included in the front-end module circuitry 104, radio IC circuitry 106 or elsewhere in the radio architecture 100 may include one or more variable inductors (such as 420) and/or other elements in configurations that may or may not be similar to the configuration shown in FIG. 4. As an example, the inductor 115 may be included in an RLC filter.

In some embodiments, filters that include one or more variable inductors may be used for up-conversion and/or down-conversion of signals between one or more frequency bands. Inductances may be varied as part of tuning center frequencies, bandwidths or frequency responses of the filters. In some embodiments, the frequency bands may include a baseband range. In some embodiments, the frequency bands may include one or more RF or intermediate frequency (IF) bands. As an example, signals may be converted between baseband and the RF and IF bands. As another example, signals may be converted between RF bands, such as conversion between a first RF band and a second RF band. As another example, signals may be converted between an RF band and an IF band, which may be concentrated in a range lower than that of the RF band.

It should be noted that, in some cases, the communication device 100 may include other variable inductors 117 for other operations that may or may not be related to those performed by the transceiver circuitry 110. In some embodiments, multiple variable inductors (such as those shown as 115 and 117) may be combined with resistors, capacitors or other components in series, in parallel or in other arrangements to produce a variety of impedance values. In some embodiments, multiple variable inductors (such as those shown as 115 and 117) may be combined in series, in parallel or in other arrangements to produce a variety of inductance values and/or impedance values.

Figure 5:
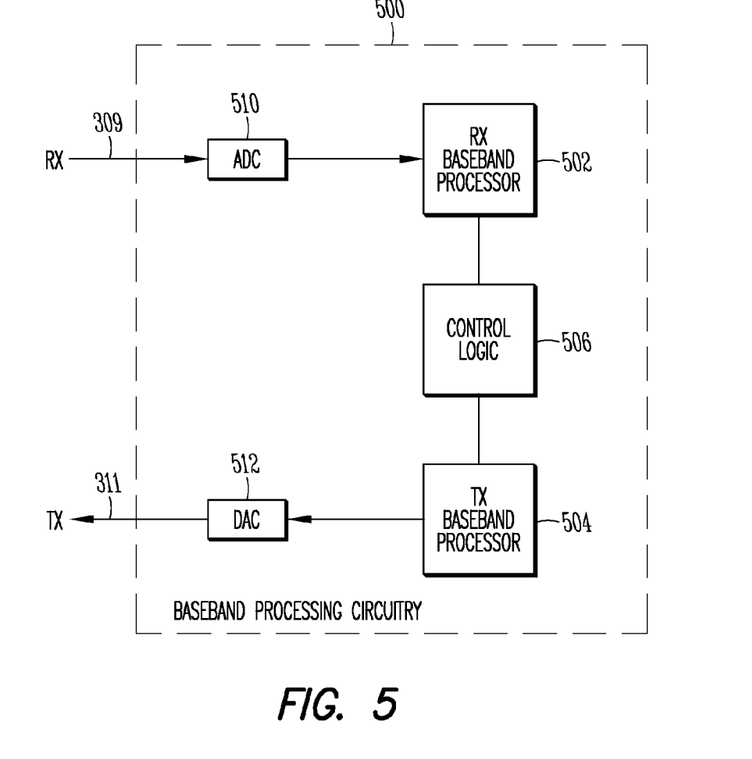
FIG. 5 illustrates a functional block diagram of baseband processing circuitry in accordance with some embodiments.

FIG. 5 illustrates a functional block diagram of baseband processing circuitry 500 in accordance with some embodiments. The baseband processing circuitry 500 is one example of circuitry that may be suitable for use as the baseband processing circuitry 108 (FIG. 1), although other circuitry configurations may also be suitable. The baseband processing circuitry 500 may include a receive baseband processor (RX BBP) 502 for processing receive baseband signals 309 provided by the radio IC circuitry 106 (FIG. 1) and a transmit baseband processor (TX BBP) 504 for generating transmit baseband signals 311 for the radio IC circuitry 106. The baseband processing circuitry 500 may also include control logic 506 for coordinating the operations with the baseband processing circuitry 500.

In some embodiments (e.g., when analog baseband signals are exchanged between the baseband processing circuitry 500 and the radio IC circuitry 106), the baseband processing circuitry 500 may include ADC 510 to convert analog baseband signals received from the radio IC circuitry 106 to digital baseband signals for processing by the RX BBP 502. In these embodiments, the baseband processing circuitry 500 may also include DAC 512 to convert digital baseband signals from the TX BBP 504 to analog baseband signals.

Referring to FIG. 1, in some embodiments, the antennas 101 (FIG. 1) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, the radio architecture 100 may be part of a communication device such as a wireless local area network (WLAN) communication station (STA), a wireless access point (AP), user equipment (UE), an Evolved Node-B (eNB), a base station or a mobile device including a Wireless Fidelity (Wi-Fi) device. In some of these embodiments, radio architecture 100 may be configured to transmit and receive signals in accordance with specific communication standards, such as the Institute of Electrical and Electronics Engineers (IEEE) standards including IEEE 802.11-2012, 802.11n-2009, 802.11ac, and/or 802.11 ax standards and/or proposed specifications for WLANs. In some embodiments, radio architecture 100 may be configured to transmit and receive signals in accordance with Third Generation Partnership Project (3GPP) standards including Long Term Evolution (LTE) standards. The scope of the embodiments is not limited in this respect, however, as the radio architecture 100 may also be suitable to transmit and/or receive communications in accordance with other techniques and standards. In addition, the radio architecture 100 may be configured to transmit and receive signals in multiple frequency bands in some embodiments.

In some embodiments, the radio architecture 100 may be part of a communication device such as a personal digital assistant (PDA), a laptop or portable computer with wireless communication capability, a web tablet, a wireless telephone, a smart-phone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the communication device may include one or more of a keyboard, a display, a non-volatile memory port, multiple antennas, a graphics processor, an application processor, speakers, and other mobile device elements. The display may be an LCD screen including a touch screen The communication device may be or may be configured to operate as a mobile device and/or a stationary non-mobile device. The communication device may also be, or may be part of, an apparatus for such a device. For instance, an AP may include the communication device in addition to other equipment, components or elements. It should also be noted that some embodiments may be related to other electrical devices, electrical circuits or other devices that may or may not be related to communication, as will be described below.

In accordance with embodiments, the variable inductor may comprise a signal wire and a control wire to receive a direct current (DC) control current. The variable inductor may further comprise a magnetic material integrated with the signal wire and the control wire. When a DC control current applied to the control wires takes a first current value, an inductance between an input node and an output node on the signal wire may take a first inductance value. When the DC control current takes a second current value, the inductance between the input node and the output node may take a second inductance value. These embodiments will be described in more detail below.

Figure 6:
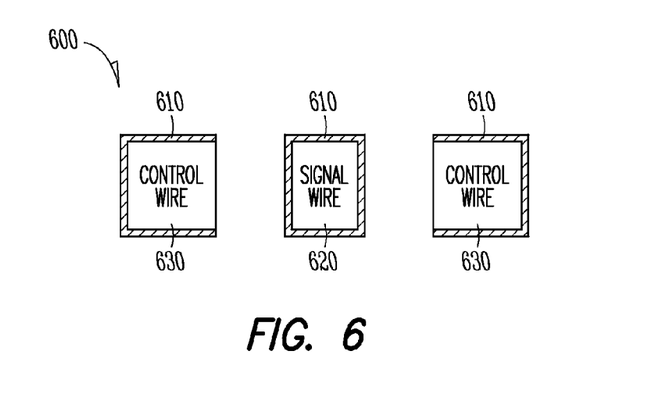
FIG. 6 illustrates an example of a variable inductor in accordance with some embodiments.

FIG. 6 illustrates an example of a variable inductor in accordance with some embodiments. It should be noted that embodiments are not limited to the arrangement of the elements as shown in the example variable inductor 600 as shown in FIG. 6, although the example variable inductor 600 may illustrate some or all of the concepts described herein. In addition, some or all of the techniques and other aspects described below as part of the discussion of the variable inductor 600 may also be applicable to other embodiments (such as those in FIGS. 8-9).

A cross sectional view of the example variable inductor 600 is shown in FIG. 6. The variable inductor 600 may include magnetic material 610, one or more signal wires 620, and one or more control wires 630. As shown in the example of FIG. 6, the magnetic material 610 may surround or encompass both the signal wire 620 and the control wires 630 in some cases, although this is not a requirement.

In some embodiments, the variable inductor 600 may be or may be part of an integrated circuit or integrated component. Accordingly, some or all elements of the variable inductor 600 may be internal to the variable inductor. In some cases, some or all of the elements of the variable inductor may be configured in a semi-permanent manner.

Signals passing through an inductor, such as the variable inductor 600 and/or other variable inductors described herein, may be affected according to an inductance (and perhaps other factors). Accordingly, the variable inductor may be parameterized or characterized in terms of the inductance. In some cases, magnetic effects may induce a voltage between two points of the variable inductor 600, such as an input point and an output point of the signal wire 620. As an example, the inductance of the variable inductor 600 may depend on the induced voltage. In addition, an impedance (and therefore a frequency response) of the signal wire 620 may depend on the inductance. For instance, the variable inductor 600 may be included as part of a band-pass RLC filter (such as the RLC circuit 400 in FIG. 4) and the inductance may affect a frequency response of the RLC filter in terms of bandwidth, center frequency or other factors. As part of these and other applications, the variable inductor 600 may be configured such that the inductance may be tuned electronically, as will be described below.

In some embodiments, the control wires 630 may be coupled to a direct current (DC) current source, which may provide a control current to the control wires 630. The DC current source may be a variable current source, in some cases, and therefore the control current may also be variable in terms of amperes (amps) or other measurement. In some embodiments, the DC current source may be integrated with the variable inductor 600, although the scope of embodiments is not limited in this respect.

In some cases, a magnetic field may be produced by the control wires 630 when current passes through them and a magnetic field strength may vary with the DC control current. The magnetic field may affect other elements in the variable inductor 600, including, but not limited to, elements located in relatively close proximity to the control wires 630. As an example, the magnetic material 610 may conduct magnetic flux as a result of the magnetic field produced from the control wires 630. In some cases, the magnetic field may therefore be "applied to" the magnetic material 610, which may conduct an amount of magnetic flux, or a magnetic flux density, in response.

A permeability of the magnetic material 610 may be related to a ratio of the magnetic flux density to the strength of the magnetic field that is applied to the magnetic material 610. Accordingly, as the strength of the magnetic field is varied, the magnetic flux density may also vary. Such a relationship may be captured in a B-H curve plotting the magnetic flux density (in Teslas or other unit) against the field strength (in Oerstads or other unit). In some cases, the permeability and/or the B-H curve may be related to physical properties of the material. It should be noted that some embodiments may use or may be based on one or more absolute permeability values. For instance, the absolute permeability may be given in units such as Henries per meter or other suitable unit, and may be denoted as $\mu$. Some embodiments may use or may be based on one or more relative permeability values, which may be measured with respect to a free space permeability. For instance, the free space permeability value of $\mu_0 = 4\pi \times 10^{-2}$ Henries per meter may be used, which may be approximately 1.256637 Henries per meter. The relative permeability may be determined as $\mu/\mu_0$ or similar. Accordingly, reference to a "permeability" is not limited to absolute permeability or to relative permeability.

Figure 7:
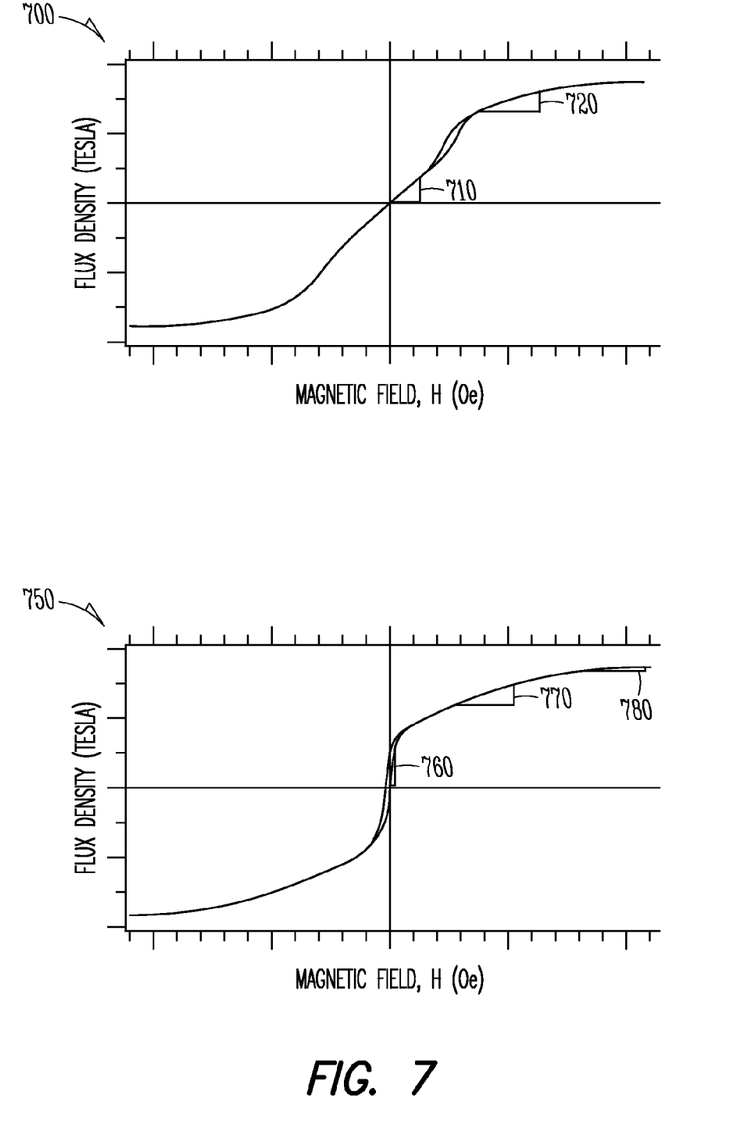
FIG. 7 illustrates examples of flux density behavior as a function of magnetic field strength for magnetic materials in accordance with some embodiments.

FIG. 7 illustrates examples of flux density behavior as a function of magnetic field strength for magnetic materials in accordance with some embodiments. The plots 700 and 750 show example B-H plots for different magnetic materials, and may be used to illustrate concepts below. It should be noted that the B-H plots 700 and 750 may or may not be applicable to the particular magnetic material 610 or to other magnetic materials described herein, although the plots 700 and 750 may illustrate concepts discussed.

In some embodiments, a magnetic material may behave according to a monotonically increasing (or monotonically non-decreasing) relationship between the magnetic flux density and the magnetic field strength. That is, when the strength of the magnetic field is increased, the magnetic flux density conducted by the magnetic material may generally increase or remain unchanged. Such behaviors may be reflected in the B-H curve of a magnetic material, such as shown in the B-H curves 700 and 750 in FIG. 7. It should be noted that embodiments are not limited to the monotonically increasing or monotonically non-decreasing relationship previously described. For instance, it may be possible that a portion of the range for the magnetic field strength of some magnetic materials does not exhibit such behavior.

As an example, the relationship between the magnetic flux density and the magnetic field strength may be linear or approximately locally linear and the permeability of the magnetic material may therefore be constant or nearly constant. It should be noted that the permeability in this case may be or may be related to the slope of the B-H curve. As previously described, embodiments are not limited to usage of absolute or relative permeabilities. For instance, the slope of the example B-H curves presented may be related to the relative permeability which may be related to the absolute permeability as previously described. However, embodiments are not limited by the example B-H curves.

As another example, the relationship between conducted magnetic flux density and applied magnetic field strength may be linear over one or more portions of the curve. That is, the B-H curve may include one or more approximately linear regions in which the permeability is near constant. In some embodiments, the permeabilities for the regions may be different. For instance, in the B-H curve 700 in FIG. 7, when the magnetic field strength varies within a first range 710, the conducted flux density may vary almost linearly according to a first permeability (or the slope of the B-H curve 700 in that linear region 710). When the magnetic field strength varies within a second range 720, the conducted flux density may vary almost linearly according to a second permeability that is different from the first permeability. In this example, the first permeability for the range 710 is higher than the second permeability for the range 720.

It should be noted that embodiments are not limited to one or two such near linear regions. In some embodiments, the B-H plot for the magnetic material may include more than two linear regions. For instance, in the B-H plot 750 in FIG. 7, three such regions 760, 770 and 780 are shown, each with a different permeability. That is, the first permeability associated with the region 760 may be higher than the second permeability associated with the region 770. The third permeability associated with the region 780 may be smaller than the other two, and may even be below 1.0 in some cases.

It should also be noted that a constant slope of the B-H curve may indicate a constant permeability over a range of magnetic field strength, but embodiments are not limited to a constant slope. In some cases, the B-H curve may exhibit a relationship that is nearly linear or linear to within a particular percentage. For instance, the B-H curve may deviate from a "best-fit line" or other line by less than one percent, in some embodiments, and may be considered nearly linear or of nearly constant permeability. Embodiments are not limited to the usage of one percent, however, as other tolerance numbers may be used, such as 0.1%, 0.5%, 2.0% or 5.0% or a number within the range of 0.1% to 5.0%. In addition, the tolerance number may also be selected from a range below 0.1% or above 5.0%. In some cases, the selection of the tolerance number may be a design consideration.

As another example, when the magnetic field strength applied to the magnetic material 610 increases to a certain point and beyond, the conducted flux density may or may not increase. When the conducted flux density does not increase (or increases by less than a particular amount or percentage) in response to such an increase in magnetic field strength, the magnetic material may be considered "saturated." In some embodiments, for a saturation region of the magnetic field strength, the density of the conducted magnetic flux may increase by less than a magnetic flux threshold in response to an increase in the magnetic field strength. The magnetic flux threshold may be specified in terms of a percentage, a fraction or a unit of flux density such as a Tesla or other.

It should be noted that regions of saturation may be indicated by flat, or relatively flat, regions in the B-H curve, which may indicate a very small permeability. In the saturation regions, the slope may take a value that is equal to, close to or based on the free space permeability previously described. For instance, when a relative permeability is indicated by the B-H curve, the slope may be 1.0, or may tend toward 1.0. This may indicate that the absolute permeability is equal to or close to the free space permeability. As an example, the B-H curves 700 and 750 may become even flatter when expanded beyond the range shown for the magnetic field strength, thus indicating a saturation region. As another example, in a saturation region, as the magnetic field strength is varied over the region, the conducted flux density may remain within a particular range. For instance, the conducted magnetic flux throughout that region may be within a particular percentage of a saturation value, either above or below it.

As seen in the example B-H plots 700 and 750, when the magnetic field is applied, some magnetic materials may exhibit multiple permeabilities or may have behave according to multiple permeabilities. In addition, some magnetic materials may saturate when the applied magnetic field is sufficiently strong. As will be described below, a selection of the magnetic material to be included in the variable inductor may be based on such properties as part of a design process.

Referring back to FIG. 6, an inductance on the signal wire 620 may result when the magnetic material 610 conducts the magnetic flux. In some embodiments, the resulting inductance of the signal wire 620 may be related to the permeability of the magnetic material 610. Accordingly, the inductance may be directly proportional to the permeability and different permeabilities may result in different inductances for the signal wire 620. In addition, a permeability equal to or close to the permeability of free space may be realized when the magnetic material 610 is saturated, which may result in an inductance of nearly zero for the signal wire 620.

As previously described, multiple permeabilities (including the permeability of free space in some cases) may be realized for some magnetic materials as a function of the applied magnetic field strength. In addition, the strength of the magnetic field may be related to the DC control current into the control wires 630 as also described previously. Accordingly, variation in the DC control current to the control wires 630 may result in different inductance values for the signal wire 620. That is, the inductance of the variable inductor 600 may be electronically tuned by variation of the DC control current in some embodiments.

It should be noted that the resulting inductance and/or other aspects of the variable inductor 600 may be affected by any number of physical factors, including but not limited to the following examples. As an example, the type of magnetic material 610 and its size, the geometry of the variable inductor 600, and the arrangement of the elements of the variable inductor 600 may affect the inductance and other factors. As another example, a degree of variation for the strength of the magnetic field of the control wires 630 may depend on factors such as the arrangement or position of the control wires 630 and/or a number of windings of the control wires 630. As another example, a proximity and orientation of the control wires 630 and the magnetic material 610 may affect the strength of the magnetic field at the magnetic material 610. As another example, the relationship between permeability and inductance may depend on the orientation and position of the signal wires 620 and/or a number of windings of the signal wires 620.

Figure 8:
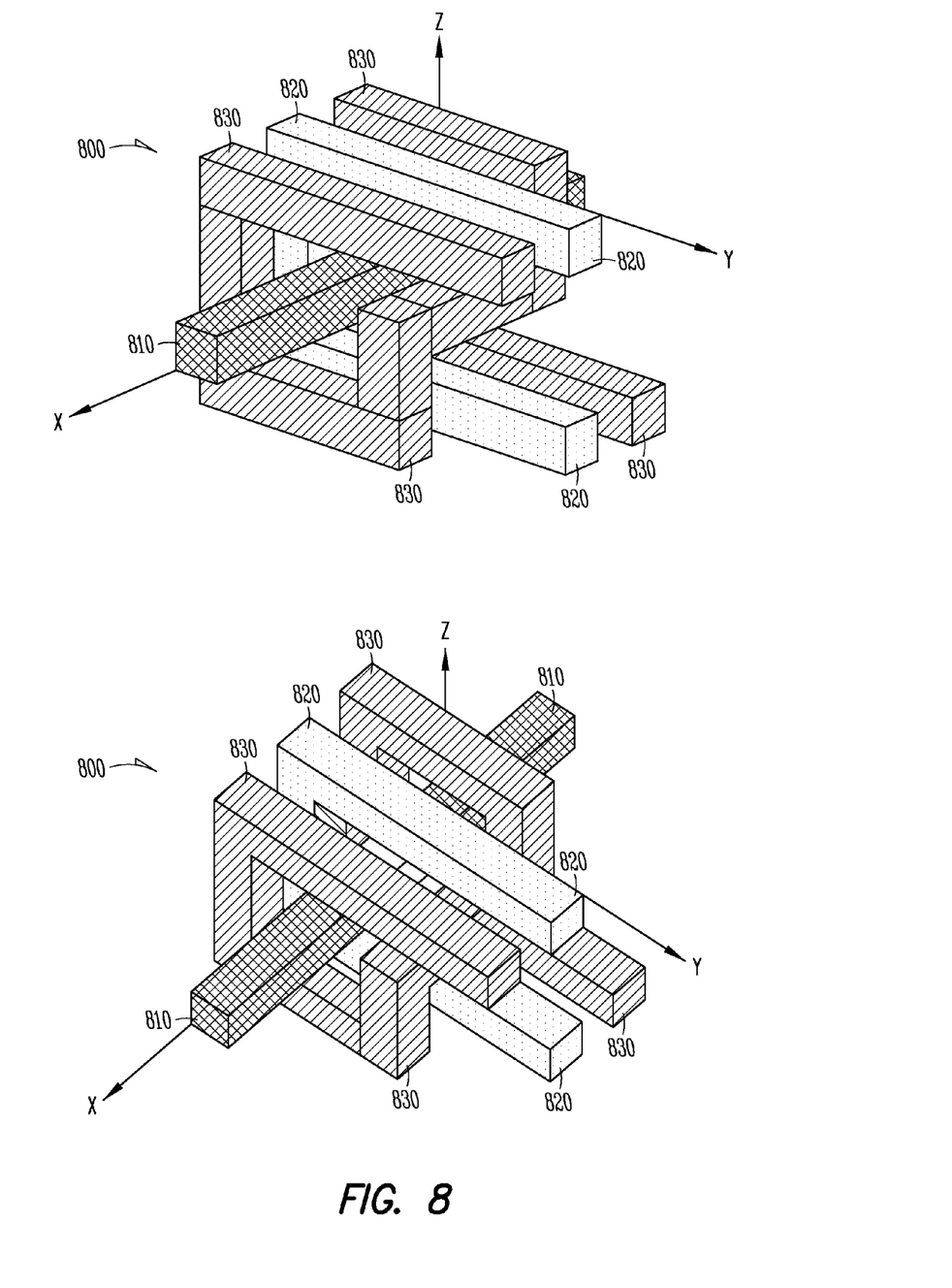
FIG. 8 illustrates another example of a variable inductor in accordance with some embodiments.
Figure 9:
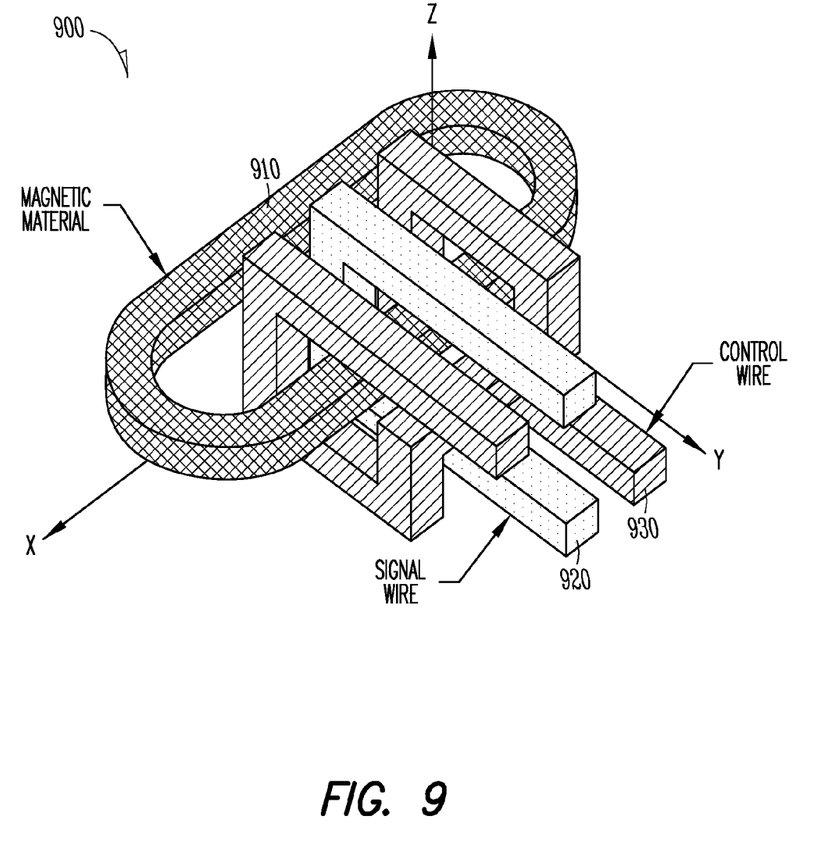
FIG. 9 illustrates another example of a variable inductor in accordance with some embodiments.

FIG. 8 illustrates another example of a variable inductor in accordance with some embodiments. Two perspectives of the example variable inductor 800 are shown. The magnetic material 810 includes an elongated piece of linear material that is wrapped by a signal wire 820 with a single winding and a control wire 830 with two windings. FIG. 9 illustrates another example of a variable inductor in accordance with some embodiments. In the example variable inductor 900, the magnetic material 910 includes an elliptical piece of material with the signal wire 920 and control wire 930 wrapped around one side of the magnetic material 910. The signal wire 920 has a single winding and the control wire 930 has two windings. In some embodiments, the elliptical piece of material may include two linear sections in a parallel configuration. In addition, the ends of those two linear sections may be connected by arc sections as shown in the example of FIG. 9. The signal wire may encompass one of the linear sections in a perpendicular arrangement with one or more windings, such that the input node and the output node of the signal wire are positioned at the same side of the magnetic material.

It should be noted that embodiments are not limited to elliptical shapes, however. As an example, the magnetic material may take a shape that is circular, approximately circular, approximately elliptical, oval, triangular or other shape. As another example, the magnetic material may be configured such that a cross section of it (as seen from above or from any other perspective) may include any closed curve. As another example, the magnetic material may be configured such that a cross section of it (as seen from above or from any other perspective) may include any open curve. These closed curves and open curves may be "free-form" in some cases.

In some embodiments, the shape of the magnetic material (such as the elliptical shape of the magnetic material 910) may improve a quality factor of the inductance. The shape of the magnetic material, therefore, may be part of a design process. In addition, a thickness or other shape factor may be determined as part of the design process, as it may affect factors such as permeability and others described herein.

In some embodiments, a solenoid structure may be used for multiple windings of signal wires and/or control wires, which may enable usage of only a single layer of magnetic material. As another example, a planar structure that uses two or more layers of magnetic material may be used.

It should be noted that embodiments are not limited to the arrangement of the elements as shown in the example variable inductors 600, 800, and 900 shown in FIGS. 6 and 8-9, although those example variable inductors 600, 800, and 900 may illustrate some or all of the concepts described herein. Accordingly, references to a variable inductor may be applicable to these example embodiments, in some cases, and may also be applicable to other variable inductor embodiments. In addition, performance factors, such as inductance or others, may be different for the different example variable inductors 600, 800, and 900 and for other embodiments.

In some embodiments, the variable inductance of the variable inductor may be realized by an application of a DC magnetic field to a magnetic material surrounding a signal wire. Due to the non-linear nature of magnetization in some magnetic materials, variation in the DC field may result in changes to permeability which may lead to variation in inductance for the signal wire. As an example, the DC field may be adjusted to saturate the magnetic material, thereby eliminating or reducing the inductance of the signal wire. In some embodiments, a two state or multi-state magnetic material, which may exhibit different permeabilities based on the applied DC field, may be used.

In some embodiments, the magnetic material may be selected for the variable inductor based on regions of permeability, saturation regions, a desired group of inductance values or other factors. Accordingly, physical configurations and/or layouts of the magnetic material and the signal wires may be determined based at least partly on those factors. In addition, physical configurations and/or layouts of the control wires may also be determined, and may be based on magnetic field strength produced by the control wires, conducted flux density of the magnetic materials or other factors. In some embodiments, the desired group of inductances may include one or more values near zero, and the saturation region may be of interest in such cases.

As an example, when the control current applied to the control wires is low or zero, the inductance of the variable inductor may be high. When the control current is high, the magnetic material may saturate and the inductance of the variable inductor may be nearly zero or may be low.

These examples are not limiting, however, as any suitable design techniques may be used based on some or all of the concepts described herein.

It should also be noted that some of the components or techniques disclosed herein, such as the variable inductor, may be included in other devices that may or may not be related to communication devices. As an example, a radio or television receiver may include one or more variable inductors for tuning of a carrier frequency to a channel or for other tasks. As another example, radio frequency identification (RFID) tags or other RFID devices may include a variable inductor. As another example, a sensor device may tune a variable inductor to change a sensing parameter or other parameter. For instance, a gas sensor may be configured to detect multiple gases, such as hydrogen and oxygen. In some cases, a variable inductor included as part of the gas sensor may be tuned to select a particular gas to be detected by the gas sensor.

Figure 10:
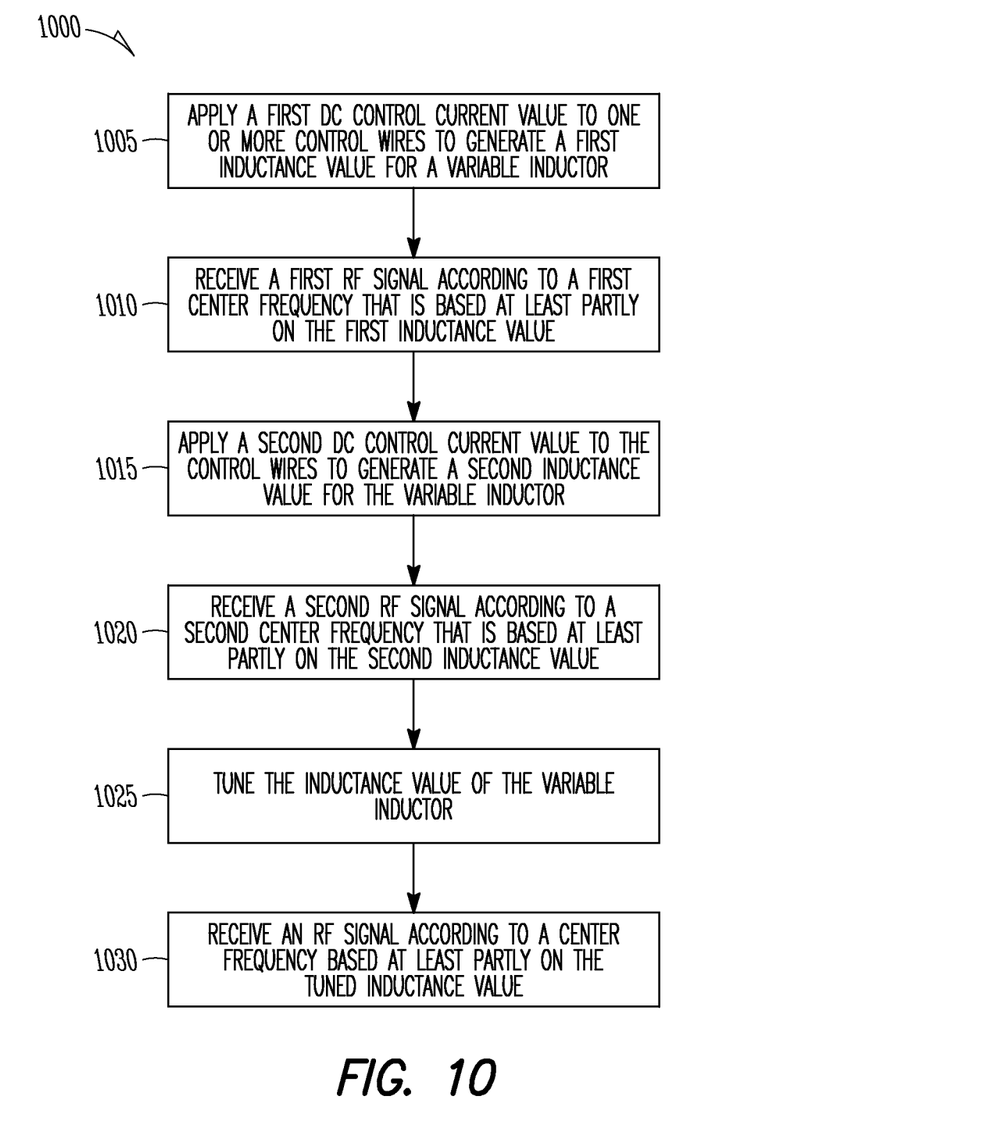
FIG. 10 illustrates the operation of a method of receiving signals in variable frequency bands in accordance with some embodiments.

FIG. 10 illustrates the operation of a method of receiving signals in variable frequency bands in accordance with some embodiments. It is important to note that embodiments of the method 1000 may include additional or even fewer operations or processes in comparison to what is illustrated in FIG. 10. In addition, embodiments of the method 1000 are not necessarily limited to the chronological order that is shown in FIG. 10. In describing the method 1000, reference may be made to FIGS. 1-9, although it is understood that the method 1000 may be practiced with any other suitable systems, interfaces and components. In some embodiments, the method 1000 may be practiced by or practiced on communication devices or the radio architecture 100 for such communication devices. The communication devices previously described (such as the STA, AP, UE, eNB and others) may be used, in some cases, although embodiments are not limited to those communication devices. In some embodiments, the method 1000 may be practiced by or practiced on other electrical devices, components or systems that may or may not be related to communication devices.

At operation 1005, a first DC control current value may be applied to one or more control wires included in a variable inductor to generate a first inductance value for the variable inductor. Although the method 1000 is not limited as such, previously described techniques related to embodiments of variable inductors may be used. As an example, applying the DC control current may generate a DC magnetic field around the control wires and varying the DC control current may generate a variable strength DC magnetic field around the control wires. The DC magnetic field may be applied to a magnetic material included in the variable inductor. The magnetic material may operate according to a permeability that may depend on the strength of the DC magnetic field. An inductance between an input point and an output point of a signal wire included in the variable inductor may be related to the permeability at which the magnetic material operates. Accordingly, the inductance for the signal wire (and therefore for the variable inductor) may be varied by tuning of the DC control current.

At operation 1010, a first RF signal may be received according to a first center frequency. That is, the first RF signal may be concentrated near or around the first center frequency. As previously described, a receiving circuit of the communication device (such as a filter or other circuit) may be tuned to the first center frequency in order to receive the first RF signal. In addition, the variable inductor may be included in the receiving circuit, and the frequency response and/or center frequency of the filter may depend at least partly on the inductance of the variable inductor. For instance, the RLC filter 400 in FIG. 4 or other circuit that includes one or more variable inductors may be used.

At operation 1015, a second DC control current value may be applied to the control wires to generate a second inductance value for the variable inductor. At operation 1020, a second RF signal may be received according to a second center frequency. In some embodiments, the first and second inductances may be different. In addition, the first and second center frequencies may be different, in some embodiments, and the differences may be related to a difference between the first and second inductances. Accordingly, tuning of the DC control current may change the inductance of the variable inductor and therefore may change a center frequency of the receiving circuit. The tuning of the DC control current, therefore, may enable reception of RF signals in different frequency bands. Although the method 1000 is not limited as such, previously described techniques related to embodiments of variable inductors and reception of signals may be used at operations 1015 and 1020.

At operation 1025, the inductance value of the variable inductor may be tuned. In some embodiments, the inductor may be tuned by applying different values of DC control current to the control wires, using previously described techniques. At operation 1030, an RF signal may be received according to a center frequency that may be based at least partly on the tuned inductance value. Embodiments are not limited to the use of a first and second inductance value. For instance, three or more inductance values may be used in some cases. In addition, embodiments are also not limited to the use of a first and second center frequency (or frequency band), as three or more frequency bands may be used in some cases. In addition, embodiments that use one inductance value and/or one center frequency are also possible. As described previously, physical factors like the geometry of the variable inductor and the materials used may affect the possible inductance values that may be realized. In addition, some embodiments may include multiple variable inductors and/or other components in a variety of configurations. Accordingly, some aspects of performance and/or behavior may vary in these configurations, including inductance values, impedance values, frequency responses and/or other aspects.

An example of a variable inductor is disclosed herein. The variable inductor may comprise a signal wire and a control wire to receive a direct current (DC) control current. The variable inductor may further comprise a magnetic material integrated with the signal wire and the control wire. Applying a first DC control current value to the control wires may generate a first inductance value between an input node and an output node on the signal wire. Applying a second DC control current value to the control wires may generate a second inductance value between the input node and the output node.

In some examples, the variable inductor may comprise a single wire to receive the signal and the direct current (DC) control current. The variable inductor may further comprise a magnetic material integrated with the signal wire and the control wire. When a DC control current applied to the wire takes a first current value, an inductance between an input node and an output node on the wire may take a first inductance value. When the DC control current takes a second current value, the inductance between the input node and the output node may take a second inductance value.

In some examples, if a DC magnetic field applied to the magnetic material is in a first range of magnetic field strength, the magnetic material may operate according to a first permeability. If the DC magnetic field is in a second range of magnetic field strength, the magnetic material may operate according to a second permeability. The first inductance value may be based on the first permeability and the second inductance value may be based on the second permeability.

In some examples, the control wires may generate the DC magnetic field in response to applying the DC control current to the control wires. In some examples, applying the first DC control current value may generate the DC magnetic field in the first range of magnetic field strength. Applying the second DC control current value may generate the DC magnetic field in the second range of magnetic field strength. In some examples, if the DC magnetic field is in the first range of magnetic field strength, a magnetic flux density conducted by the magnetic material may vary linearly with the magnetic field strength according to the first permeability. If the DC magnetic field is in the second range of magnetic field strength, the magnetic flux density may vary linearly with the magnetic field strength according to the second permeability.

In some examples, a saturation region of the magnetic material may include the second range of magnetic field strength and the second permeability may be based on a permeability of free space. In some examples, applying a third DC control current value to the control wires may generate a third inductance value between the input node and the output node. If the DC magnetic field is in the third range of magnetic field strength, the magnetic material may operate according to a third permeability. The third inductance value may be based on the third permeability.

In some examples, the magnetic material may include a linear portion of material. The signal wire may encompass the magnetic material in a perpendicular arrangement with one or more windings, such that the input node and the output node of the signal wire may be positioned at the same side of the magnetic material. In some examples, the magnetic material may include an elliptical portion of material that may include two linear sections in a parallel configuration. The signal wire may encompass one of the linear sections in a perpendicular arrangement with one or more windings, such that the input node and the output node of the signal wire may be positioned at the same side of the magnetic material. In some examples, the magnetic material may include a linear portion of material and the signal wire and the control wire may be included as part of another wire. In some examples, the variable inductor may further include a DC current source for applying the DC control current to the control wires. In some examples, the magnetic material may be integrated with the signal wire and the control wires in an integrated circuit. In some examples, the magnetic material may be integrated with the signal wire and the control wires in a semi-permanent configuration.

An example of an integrated variable inductor is disclosed herein. The integrated variable inductor may comprise a magnetic material to conduct a magnetic flux density in response to applying a variable strength magnetic field to the magnetic material. A magnetic field strength of the magnetic field may be variable. The integrated variable inductor may further comprise a signal wire configured to vary an inductance between an input point and an output point on the signal wire at least partly based on a permeability of the magnetic material. For at least two non-overlapping regions of the magnetic field strength, a density of the conducted magnetic flux may vary linearly with the magnetic field strength according to permeabilities for the regions. In some examples, the permeabilities for at least some of the regions may be different. In some examples, the variable inductor may further comprise a control wire to receive a variable control current from a direct current (DC) current source. The control wire may generate the magnetic field applied to the magnetic material when the variable control current is received. In some examples, for a saturation region of the magnetic field strength, the density of the conducted magnetic flux may increase by less than a magnetic flux threshold in response to an increase in the magnetic field strength. In some examples, a permeability for the saturation region may be based on a permeability of free space when the saturation region includes the magnetic field strength.

An example of a communication device is also disclosed herein. The communication device may comprise a variable inductor that enables conversion of a baseband signal to a radio frequency (RF) range. The communication device may further comprise a processing unit configured to generate the baseband signal based at least partly on a packet of information bits. The variable inductor may comprise a signal wire, a control wire to receive a direct current (DC) control current, and a magnetic material integrated with the signal wire and the control wire. Applying a first DC control current value to the control wires may generate a first inductance value between the input node and the output node on the signal wire. Applying a second DC control current value to the control wires may generate a second inductance value between the input node and the output node.

In some examples, the variable inductor may be included in a band-pass filter configured to operate at the RF range when the variable inductor operates according to a first inductance value. The band-pass filter may be further configured to operate at a second RF range when the variable inductor operates according to a second inductance value. In some examples, if a DC magnetic field applied to the magnetic material is in a first range of magnetic field strength, the magnetic material may operate according to a first permeability. If the DC magnetic field is in a second range of magnetic field strength, the magnetic material may operate according to a second permeability. The first inductance value may be based on the first permeability and the second inductance value may be based on the second permeability. In some examples, applying the first DC control current value may generate the DC magnetic field in the first range of magnetic field strength. Applying the second DC control current value may generate the DC magnetic field in the second range of magnetic field strength.

In some examples, the magnetic material may include a linear portion of material. The signal wire may encompass the magnetic material in a perpendicular arrangement with one or more windings, such that the input node and the output node of the signal wire may be positioned at the same side of the magnetic material. In some examples, the magnetic material may include an elliptical portion of material that may include two linear sections in a parallel configuration. The signal wire may encompass one of the linear sections in a perpendicular arrangement with one or more windings, such that the input node and the output node of the signal wire may be positioned at the same side of the magnetic material.

In some examples, the variable inductor may enable conversion of an RF signal to a baseband signal. The communication device may further comprise a processing unit configured to decode the baseband signal to determine a packet of decoded information bits.

An example of a method of receiving signals at a communication device is also disclosed herein. The method may comprise applying a first DC control current value to one or more control wires to generate a first inductance value for a variable inductor. The variable inductor may comprise the control wires and a magnetic material. The method may further comprise receiving a first radio frequency (RF) signal according to a first center frequency that is based at least partly on the first inductance value. Applying the first DC control current value to the control wires may generate a DC magnetic field in a first range of magnetic field strength. If the DC magnetic field is in the first range of magnetic field strength, a magnetic flux density conducted by the magnetic material may vary linearly with the magnetic field strength according to a first permeability.

In some examples, the method may further comprise applying a second DC control current value to the control wires to generate a second inductance value for the variable inductor. The method may further comprise receiving a second RF signal according to a second center frequency that is based at least partly on the second inductance value. Applying the second DC control current value to the control wires may generate the DC magnetic field in a second range of magnetic field strength. If the DC magnetic field is in the second range of magnetic field strength, the magnetic flux density may vary linearly with the magnetic field strength according to a second permeability.

In some examples, the first and second inductance values may be generated between an input node and an output node of a signal wire comprised by the variable inductor. The magnetic material may include a linear portion of material. The signal wire may encompass the magnetic material in a perpendicular arrangement with one or more windings, such that the input node and the output node of the signal wire may be positioned at the same side of the magnetic material.

In some examples, the first and second inductance values may be generated between an input node and an output node of a signal wire comprised by the variable inductor. The magnetic material may include an elliptical portion of material that may include two linear sections in a parallel configuration. The signal wire may encompass one of the linear sections in a perpendicular arrangement with one or more windings, such that the input node and the output node of the signal wire may be positioned at the same side of the magnetic material.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A variable inductor, comprising:
   a signal wire;
   a control wire to receive a direct current (DC) control current; and
   a magnetic material substantially surrounding all sides of the signal wire and partially surrounding the control wire, wherein at least a portion of the control wire is exposed, the exposed portion of the control wire facing the signal wire,
   wherein applying a first DC control current value to the control wire generates a first inductance value, proportional to a permeability of the magnetic material, between an input node and an output node on the signal wire, and
   wherein applying a second DC control current value to the control wires generates a second inductance value between the input node and the output node.

2. The variable inductor according to claim 1, wherein:
   the magnetic material operates according to a first permeability when a DC magnetic field applied to the magnetic material is in a first range of magnetic field strength;
   the magnetic material operates according to a second permeability when the DC magnetic field is in a second range of magnetic field strength; and
   the first inductance value is based on the first permeability and the second inductance value is based on the second permeability.

3. The variable inductor according to claim 2, wherein the control wires generate the DC magnetic field in response to applying the DC control current to the control wires.

4. The variable inductor according to claim 3, wherein:
   applying the first DC control current value generates the DC magnetic field in the first range of magnetic field strength, and
   applying the second DC control current value generates the DC magnetic field in the second range of magnetic field strength.

5. The variable inductor according to claim 2, wherein:
   a magnetic flux density conducted by the magnetic material varies linearly with the magnetic field strength according to the first permeability, when the DC magnetic field is in the first range of magnetic field strength, and
   the magnetic flux density varies linearly with the magnetic field strength, according to the second permeability, when the DC magnetic field is in the second range of magnetic field strength.

6. The variable inductor according to claim 2, wherein a saturation region of the magnetic material includes the second range of magnetic field strength and the second permeability is based on a permeability of free space.

7. The variable inductor according to claim 2, wherein:
   applying a third DC control current value to the control wires generates a third inductance value between the input node and the output node, the magnetic material operates according to a third permeability when the DC magnetic field is in a third range of magnetic field strength; and the third inductance value is based on the third permeability.

8. The variable inductor according to claim 1, wherein:

the magnetic material includes a linear portion of the magnetic material, and the signal wire and the control wire are included as part of another wire.

9. The variable inductor according to claim 1, wherein the variable inductor further includes a DC current source for applying the DC control current to the control wires.

10. The variable inductor according to claim 1, wherein the magnetic material is integrated with the signal wire and the control wires in an integrated circuit.

11. A variable inductor comprising:

a signal wire;

a control wire to receive a direct current (DC) control current; and a linear portion of a magnetic material, wherein the signal wire encompasses the magnetic material in a perpendicular arrangement, such that at least a portion of the control wire is parallel to the linear portion of the magnetic material, and such that the portion of the control wire and the input node and the output node of the signal wire are positioned at the same side of the magnetic material.

12. The variable inductor according to claim 11, wherein:

the magnetic material includes an elliptical portion of the magnetic material that includes two linear sections in a parallel configuration, and the signal wire encompasses one of the linear sections in a perpendicular arrangement, such that at least the portion of the control wire is parallel to at least one of the linear sections of the magnetic material and such that the portion of the control wire and the input node and the output node of the signal wire are positioned at the same side of the magnetic material.

\* \* \* \* \*

UNITED STATES PATENT AND TRADEMARK OFFICE
CERTIFICATE OF CORRECTION

PATENT NO. : 9,997,290 B2
APPLICATION NO. : 14/752180
DATED : June 12, 2018
INVENTOR(S) : Gardner et al.

Page 1 of 1

It is certified that error appears in the above-identified patent and that said Letters Patent is hereby corrected as shown below:

On the Title Page

In Column 2, under "Other Publications", Line 1, delete ""Europeran" and insert --"European-- therefor In the Claims In Column 17, Line 17, in Claim 11, delete "inductor" and insert --inductor,-- therefor In Column 18, Line 16, in Claim 12, delete "material" and insert --material,-- therefor Signed and Sealed this
Twenty-eighth Day of May, 2019

Andrei Iancu
*Director of the United States Patent and Trademark Office*